United States Patent Office 3,419,637
Patented Dec. 31, 1968

3,419,637
CHEMICAL-RESISTANT POLYESTER RESINS BASED UPON DICYCLOHEXANOLS AND NEOPENTYL GLYCOL-TYPE DIOLS
Earl E. Parker, Allison Park, Pa., assignor to PPG Industries, Inc., a corporation of Pennsylvania
No Drawing. Filed June 30, 1966, Ser. No. 561,739
18 Claims. (Cl. 260—871)

ABSTRACT OF THE DISCLOSURE

Novel unsaturated polyesters which are chemically-resistant are formed by reacting a neopentyl glycol-type diol, a dicyclohexanol compound, and an ethylenically unsaturated dicarboxylic acid.

---

This invention relates to novel and useful resinous compositions and, more particularly, to compositions comprising a chemical-resistant, unsaturated polyester resin.

Unsaturated polyesters, that is, polymerization reaction products of (1) an ethylenically unsaturated dicarboxylic acid, and, optionally, a saturated dicarboxylic acid, and (2) a dihydric alcohol, are extensively utilized commercially in the preparation of many useful products. When crosslinked at points of unsaturation, such polyesters can be used in a variety of applications such as, for example, molding resins, casting resins, and coating resins.

Recently, there has been a considerable increase in interest in the use of polyesters for applications in which chemical resistance is a necessary property, such as in linings for tanks and as a construction material for chemical process equipment. By "chemical resistance" is meant the ability of a cured polyester resin to withstand chemical attack by water soluble inorganic chemicals, including acids such as HCl, bases such as NaOH, and salts such as NaCl, as well as water itself. The relative cost, the physical strength, the molding properties and application properties of compositions employing such crosslinked polyesters have prompted workers in the field to examine the possibility of using them for such purposes. However, where the need for chemical-resistant material has arisen, it has been found that polyester compositions as a class do not have sufficient chemical-resistance to make their use practical or desirable in an environment in which these materials are present.

Certain polyesters have been found to have good resistance to the above materials, such as those described in U.S. Patent No. 2,828,278, which are derived from dicyclohexanols. Such polyesters, however, are high-melting crystalline materials and thus cannot be readily combined with the conventional liquid monomers necessary for crosslinking the system. This disadvantage is very clearly demonstrated by polyesters based upon 4,4'-isopropylidenedicyclohexanol. Such polyesters, employing styrene as a monomeric material, for example, can be made into chemical-resistant coating compositions, but in order to achieve this result the unsaturated polyester must be blended at low temperatures, usually room temperature, with the styrene.

This is necessary since, if the resin is hot blended with the styrene, as is usually the practice, the temperature required to soften or melt the polyester, in order to increase its solubility in the styrene, is so high that the styrene tends to polymerize during the mixing operation, in the presence of reasonable amounts of inhibitors. The only alternative method is cold blending, which requires a substantially longer period of time than hot blending and, therefore, significantly increases the costs of these materials. Generally, attempts to modify resins based upon dicyclohexanols in order to reduce their crystallinity, and thereby makes a polymer which may be blended in liquid form, have resulted in resins in which the chemical resistance was markedly reduced.

It has now been discovered that the introduction of a neopentyl glycol-type diol into a dicyclohexanol-based polyester reduces the crystallinity of the polyester to such a degree that this material may be hot blended with conventional crosslinking monomers. Surprisingly, this improvement is obtained without the significant decrease in chemical-resistance which accompanies the employment of conventional glycols, such as, for example, ethylene glycol or propylene glycol. For example, 4,4'-isopropylidene dicyclohexanol-based polyesters, utilizing neopentyl glycol as the neopentyl glycol-type diol, can be easily hot blended with styrene to provide polyester compositions having very excellent chemical resistance.

The unsaturated polyester resins of this invention comprise the esterification product of an organic dicarboxylic acid and a mixture of dihydric alcohols, including, as essential components, a neopentyl glycol-type diol and a dicyclohexanol compound.

The neopentyl glycol-type diols which are essential in achieving the low crystallinity of the polymers of this invention have the structure:

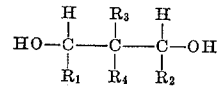

where $R_1$ and $R_2$ are selected from the group consisting of hydrogen and lower alkyl radicals and where $R_3$ and $R_4$ are lower alkyl radicals.

The constituents represented by $R_1$ and $R_2$ include hydrogen and alkyl radicals of 1 to 5 carbon atoms, such as methyl, ethyl, or propyl radicals; and $R_3$ and $R_4$ may each be alkyl radicals of 1 to 4 carbon atoms, such as methyl, ethyl, or propyl radicals.

The preferred neopentyl glycol-type diol is 2,2-dimethyl-3,3-propanediol and other suitable diols of this type include, for example, 2,2-dimethyl-1,3-pentanediol, 2,2-dimethyl-1,3-butanediol, and 2,2-dimethyl-1,3-hexanediol.

The dicyclohexanol compound may be represented by the formula:

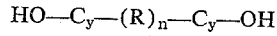

where $n$ is 0 or 1; R is an alkylidene radical, generally having 1 to 5 carbon atoms, such as methylene, ethylidene or propylidene radicals; and $C_y$ is a saturated hydrocarbon radical having a 6 carbon atom ring, which ring is attached to said OH and said R. $C_y$ can also be substituted with alkyl radicals of 1 to 3 carbon atoms such as methyl and ethyl radicals. When $n$ is 0 in the above formula, the 6 carbon atom rings are directly connected.

An especially preferred dicyclohexanol is 4,4'-isopropylidene dicyclohexanol and other useful compounds include 4,4'-ethylidene dicyclohexanol, 4,4'-butylidene dicyclohexanol and 4,4'-methylene dicyclohexanol.

The dicyclohexanol compound and the neopentyl glycol-type diol are essential ingredients of the hydroxy component used in the preparation of the present polyesters; however, other dihydroxy compounds may be incorporated into the reaction mixture in minor proportions. Such optional dihydroxy compounds include ethylene glycol, propylene glycol, 1,4-butane diol and the like.

The glycol component of the polyesters herein preferably comprises from about 85 mol percent to about 30 mol percent of dicyclohexanol and from about 15 mol percent to about 70 mol percent of neopentyl glycol-type diol. The optional glycols may be used in amounts up to about 30 mol percent of the total glycol component. An especially preferred polyhydric combination is obtained using 33 mol percent of neopentyl glycol with the remaining 67 mol percent constituting 4,4'-isopropylidene dicyclohexanol.

Various organic dicarboxylic acids can be used in making the polyesters of the invention, including saturated acids and aromatic acids, as well as ethylenically unsaturated acids. Some examples of such acids are maleic acid, phthalic acid, isophthalic acid, terephthalic acid, fumaric acid, itaconic acid, citraconic acid, sebacic acid, adipic acid, suberic acid and the like, generally having between about 2 and 15 carbon atoms. The corresponding anhydrides can also be employed, and are often preferred, in place of those acids which form anhydrides, such as for example, maleic anhydride, itaconic anhydride, phthalic anhydride, and the like. The term "dicarboxylic acids," as used herein, includes such anhydrides. An especially preferred group of organic dicarboxylic acids, or anhydrides thereof, consists of maleic anhydride, fumaric acid, isophthalic acid, terephthalic acid, phthalic acid and phthalic anhydride. A mixture of two or more different dicarboxylic acids may also be employed, as, for example, a mixture of maleic acid and phthalic anhydride. An especially preferred mixture consists of maleic anhydride and isophthalic acid.

Since an unsaturated polyester is essential in obtaining the compositions of this invention, at least 40 mol percent of the acid component of the polyester must consist of an ethylenically unsaturated dicarboxylic acid such as one of those described above.

Minor amounts of polybasic acids, such as, for example, 1,2,3-benzenetricarboxylic acid or trimellitic anhydride may also be employed in this invention, preferably in amounts not exceeding 15 mol percent of the acid component of the polyester.

The acid component of the polyesters herein comprises an ethylenically unsaturated dicarboxylic acid in an amount of about 100 mol percent to about 40 mol percent, although preferably in an amount of about 50 mol percent to about 80 mol percent, based on the total mols of acid component in the polyester.

In producing the polyesters from the above components, the polyhydric components can be employed in an equal molar ratio to the total acid component, although it is conventional practice to include an excess of the polyol, for example, up to about 30 mol percent.

The unsaturated polyester preferably comprises from about 18 mol percent to about 45 mol percent of 4,4-isopropylidene dicyclohexanol, from about 9 mol percent to about 36 mol percent of neopentyl glycol, from about 18 percent to about 45 percent of maleic anhydride, and from about 28 mol percent to about 0 mol percent of isophthalic acid, based on the total number of mols used. A specific and especially preferred polyester consists of 36 mol percent of 4,4-isopropylidene dicyclohexanol, 18 mol percent of neopentyl glycol, 28 mol percent of maleic anhydride, and 18 mol percent of isophthalic acid.

The above unsaturated polyester is prepared according to standard practices. Typically, the organic unsaturated dicarboxylic acid compound or compounds is mixed with the dicyclohexanol compound and the neopentyl glycol-type diol and the mixture heated gradually, for example, at a rate of from about 1° to 5° centigrade per minute to a temperature of from 150° C. to 250° C. An esterification reaction catalyst is also preferably employed such as, for example, dibutyl tin oxide. The reaction mixture is then maintained within this temperature range until esterification is completed, with accompanying evolution of and evaporation of water. A solvent may be used, such as a non-reactive medium of low solubility in water, as, for example, an aromatic hydrocarbon such as xylene or toluene or other medium, to distill azeotropically with the water of the reaction and thus to promote the removal of the latter from the system. Depending upon the nature of the individual reactants and the quantities employed, completion of the reaction is noted upon reaching the desired viscosity.

The polyesterification reaction can also be conducted in the complete absence of azeotroping agents, as, for example, by means of the fusion process in which a non-reactive gas is blown through the reaction mixture in order to remove the water. Such a process is described in U.S. Patent Nos. 3,109,831; 3,109,832; and 3,109,834.

In ordinary usage, the above unsaturated polyesters are crosslinked by means of polymerizable, ethylenically unsaturated compounds, such as styrene, divinyl benzene, methyl acrylate, vinyl toluene and the like. The preferred monomers are liquid compounds, soluble in the polyester components, particularly styrene, diallyl phthalate, or vinyl toluene.

The monomer component or components may be employed in amounts of up to about 60 percent of the total weight of the composition of polyester and monomer. The amount of monomer should be sufficient to provide a liquid, flowable, interpolymerizable mixture. Usually, the amount of the monomer will fall within the range of about 25 percent to about 60 percent by weight of the total mixture of polyester and monomer. At the preferred range, the monomer is utilized in an amount of about 30 percent to about 50 percent.

A particular advantage of the present compositions is that the crosslinking monomers may be combined with the above unsaturated polyester using conventional polyester process equipment, for example, by simply mixing together the components at temperatures of about 100° C. to about 140° C. To prevent any tendency for premature gelation, it is preferred to include a conventional gelation inhibitor in one or both components of the mixture. Suitable inhibitors may be selected from various materials, including the quinonic or phenolic compounds such as p-benzoquinone, hydroquinone, and 4-t-butyl catechol; quaternary ammonium salts, including trimethyl benzyl ammonium chloride, trimethyl benzyl ammonium acid oxalate, trimethyl benzyl ammonium tartrate and the like; and halide salts of amine, such as trimethylamine hydrochloride, triethylamine hydrochloride, trimethylamine hydrobromide, and the like. The gelation inhibitor remains in the solution of unsaturated polyester interpolymerizable monomer and acts as an inhibitor of gelation during subsequent storage of material before the latter is actually used. The amount of inhibitor required in the mixture during the mixing stage is susceptible to wide variation, but preferably is in a range of about 0.001 percent to about 0.1 percent by weight, based upon the polyester component of the mixture.

When the interpolymerizable mixture is to be employed in the preparation of castings or laminates or other products, there is employed a polymerization catalyst, conventionally a free-radical catalyst, such as an organic peroxide, organic hydroperoxide or esters thereof. Examples are benzoyl peroxide, tertiary butyl perbenzoate, tertiary butyl hydroperoxide, cumene hydroperoxide, azo-bis(isobutyronitrile) and the like. The catalysts are generally used in amounts of about 0.1 percent to about 5 percent by weight, based upon the mixture of interpolymerizable materials, and varying with the activity of any accelerator used and any inhibitor present in the interpolymerizable mixture.

In many applications, it is desirable to start the polymerization without the application of external heat. In such cases it is customary to add an accelerator to the system. Suitable accelerators include cobalt salts such as cobalt octoate or cobalt naphthanate and tertiary amine accelerators such as N-ethyl-N-hydroxyethyl-m-methyl-aniline and N-propyl-N-hydroxyethyl-m-methylaniline.

The following examples illustrate in detail the method of practicing the instant invention. The examples are not intended to limit the invention, however, for there are, of course, numerous possible variations and modifications.

EXAMPLE 1

In preparing an unsaturated polyester of this invention, a reaction vessel was charged with the following:

| | Mol proportions |
|---|---|
| 4,4'-isopropylidene dicyclohexanol | 10 |
| Neopentyl glycol | 2 |
| Isophthalic acid | 4 |

This mixture was gradually heated to a temperature of 235° C. and maintained at this temperature until an acid number of 15.0 was obtained. Then 6 mols of maleic anhydride were added, along with 0.1 percent by weight of the total composition of dibutyl tin oxide (catalyst), and this mixture was held at 235° C. until an acid number of 27.6 was reached. The mixture was then sparged with nitrogen, while continuing to reflux at 235° C., until a final acid number of 22.3 was reached, with a viscosity (Gardner-Holdt) of $Z_2+$. The viscosity determination on Examples 1–6 was run on a 60 percent by weight solution of the product in ethylene glycol monomethyl ether.

EXAMPLE 2

An unsaturated polyester of this invention was prepared as in Example 1, using the following proportions:

| | Mol proportions |
|---|---|
| 4,4'-isopropylidene dicyclohexanol | 9 |
| Neopentyl glycol | 3 |
| Isophthalic acid | 4 |
| Maleic anhydride | 6 |

The resulting product had an acid number of 18.7 and a viscosity (Gardner-Holdt) of $Z_3+$.

EXAMPLE 3

An unsaturated polyester of this invention was prepared as in Example 1 using the following proportions:

| | Mol proportions |
|---|---|
| 4,4'-isopropylidene dicyclohexanol | 8 |
| Neopentyl glycol | 4 |
| Isophthalic acid | 4 |
| Maleic anhydride | 6 |

The resulting product had an acid number of 18.2 and a viscosity (Gardner-Holdt) of $Z_2-$.

EXAMPLE 4

In preparing an unsaturated polyester of this invention, a reaction vessel was charged with the following:

| | Mol proportions |
|---|---|
| 4,4'-isopropylidene dicyclohexanol | 8 |
| Neopentyl glycol | 4 |
| Maleic anhydride | 8 |
| Phthalic anhydride | 2 |

The mixture was gradually heated to 235° C. and held at this temperature for about 10 hours. The final product had an acid number of 26.0 and a viscosity (Gardner-Holdt) of Z.

EXAMPLE 5

An unsaturated polyester of this invention was prepared as in Example 4 using the following proportions:

| | Mol proportions |
|---|---|
| 4,4'-isopropylidene dicyclohexanol | 8 |
| Neopentyl glycol | 4 |
| Maleic anhydride | 6 |
| Phthalic anhydride | 4 |

The final product has an acid number of 22.4 and a viscosity (Gardner-Holdt) of $X+$.

EXAMPLE 6

An unsaturated polyester of this invention was prepared as in Example 4 in the following proportions:

| | Mol proportions |
|---|---|
| 4,4'-isopropylidene dicyclohexanol | 8 |
| Neopentyl glycol | 4 |
| Maleic anhydride | 7 |
| Phthalic anhydride | 3 |

The final product had an acid number of 20 and a viscosity (Gardner-Holdt) of $Z_1+$.

EXAMPLES 7–16

The following polyester resin compositions in Table I were prepared by hot blending the unsaturated polyester of the above examples and styrene at temperatures of about 135° C., using hydroquinone as the inhibitor in an amount of 0.02 percent of the total weight of the resin.

TABLE I

| Example | Polyester of Example— | Weight percent of styrene of total composition | Viscosity (Gardner-Holdt) |
|---|---|---|---|
| 7 | 1 | 45 | $T+$ |
| 8 | 1 | 35 | $Z_5+$ |
| 9 | 2 | 45 | $R+$ |
| 10 | 2 | 35 | $Z_4+$ |
| 11 | 3 | 45 | N |
| 12 | 4 | 45 | $M+$ |
| 13 | 4 | 35 | $Z_1+$ |
| 14 | 5 | 45 | $Z+$ |
| 15 | 6 | 45 | R |
| 16 | 6 | 35 | $Y+$ |

The advantageous properties of the above polyester compositions were demonstrated by tests of castings produced by adding one percent by weight of the composition of benzoyl peroxide catalyst and curing at a schedule consisting of gelation at 140° F. plus one hour at 170° F. and one hour at 250° F.

Chemical resistance of the specimens was evaluated on a weight change and appearance basis. The castings representing the above examples were refluxed for 28 days in one of the following solutions: distilled water, 10 percent sodium hydroxide solution, or hydrochloric acid solution (one part concentrated hydrochloric acid to 9 parts distilled water). Each solution was held at its boiling point temperature throughout the test period. Each specimen was then dried in a vacuum desiccator for 24 hours and weighed. A weight change of less than 2 percent with little or no discoloration is considered excellent chemical resistance, and slight darkening is considered commercially acceptable. The results follow:

TABLE II

| Composition of Example— | Appearance and percent weight change in— | | |
|---|---|---|---|
| | $H_2O$ (unchanged) | HCl (slight darkening) | NaOH (unchanged) |
| 7 | 0.38 | 0.47 | 0.33 |
| 8 | 0.66 | 0.78 | 0.57 |
| 9 | 0.48 | 0.61 | 0.47 |
| 10 | 0.66 | 0.90 | 0.59 |
| 11 | 0.53 | 0.68 | 0.50 |
| 12 | 0.32 | 0.45 | 0.12 |
| 13 | 0.66 | 0.87 | 0.48 |
| 14 | 0.63 | 0.46 | 0.30 |
| 15 | 0.20 | 0.25 | 0.09 |
| 16 | 0.30 | 0.64 | 0.32 |

It is noted that each casting exhibited outstanding chemical resistance, as indicated by the fact that its weight change did not exceed or even approach the 2 percent acceptability limit. Furthermore, discoloration was at an acceptable minimum in the acid solution and no discoloration resulted in the other mediums. This excellent resistance is especially advantageous in view of the fact that conventional polyester compositions give products which suffer significant weight change and often completely disintegrate.

Similar results can be obtained using, for example, vinyl toluene, diallyl phthalate, methyl methacrylate, acrylonitrile, and mixtures of these with styrene, as well as by employing different acids and acid combinations such as, for example, terephthalic acid, phthalic acid, phthalic anhydride and mixtures thereof.

The polyesters of this invention, when crosslinked according to the procedure described above, are especially useful as linings for containers of water soluble inorganic chemicals and also as materials used in producing the containers—themselves. For example, they are exceptionally well suited as linings for containers of caustic solutions or hydrochloric acid solutions. Similarly, such compositions are valuable as linings for ducts, pipes and the like which carry fumes or solutions containing such chemicals and are generally useful as coatings for metal surfaces such as, for example, steel surfaces.

Although specific examples of the instant invention have been set forth hereinabove, it is not intended that the invention be limited solely thereto, but to include all the variations falling within the scope of the appended claims.

What is claimed is:

1. An amorphous unsaturated polyester comprising a glycol component comprising from about 15 percent to about 70 percent of (1) a neopentyl glycol-type diol having the formula:

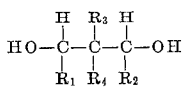

where $R_1$ and $R_2$ are selected from the group consisting of hydrogen and lower alkyl radicals and where $R_3$ and $R_4$ are each lower alkyl radicals and from about 30 percent to about 85 percent of; (2) a dicyclohexanol compound of the formula:

$$HO-C_y-(R)_n-C_y-OH$$

where $n$ is 0 or 1; $C_y$ is a saturated hydrocarbon radical having a six carbon atom ring, which ring is attached to said OH and said R; and R is an alkylidene radical having its two valences on the same carbon atom and an acid component comprising; (3) an ethylenically unsaturated dicarboxylic acid.

2. The unsaturated polyester of claim 1 wherein at least one of the diols is neopentyl glycol.

3. The unsaturated polyester of claim 1 wherein the acid component comprises at least 40 mol percent of the ethylenically unsaturated dicarboxylic acid and the remainder of the acid component comprises a member seleted from the group consisting of saturated dicarboxylic acid and aromatic dicarboxylic acid.

4. The unsaturated polyester of claim 3 wherein said diol is neopentyl glycol, said dicyclohexanol compound is 4,4'-isopropylidene dicyclohexanol, and the ethylenically unsaturated dicarboxylic acid is a member selected from the group consisting of maleic anhydride and fumaric acid and the remainder of the acid component comprises members selected from the group consisting of isophthalic acid, terephthalic acid, phthalic acid and phthalic anhydride.

5. The unsaturated polyester of claim 3 consisting of 36 mol percent of 4,4'-isopropylidene dicyclohexanol, 18 mol percent of neopentyl glycol, 28 mol percent of maleic anhydride and 18 mol percent isophthalic acid.

6. An amorphous resinous composition comprising (1) a polymerizable, ethylenically-unsaturated compound and a polyester comprising a glycol component comprising from about 15 percent to about 70 percent of; (2) a neopentyl glycol-type diol having the formula:

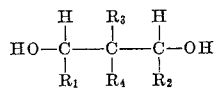

where $R_1$ and $R_2$ are selected from the group consisting of hydrogen and lower alkyl radicals and where $R_3$ and $R_4$ are each lower alkyl radicals and from about 30 percent to about 85 percent of; (3) a dicyclohexanol compound of the formula:

$$HO-C_y-(R)_n-C_y-OH$$

where $n$ is 0 or 1; $C_y$ is a saturated hydrocarbon radical having a six carbon atom ring, which ring is attached to said OH and said R; and R is an alkylidene radical having its two valences on the same carbon atom and an acid component comprising; (4) an ethylenically unsaturated dicarboxylic acid.

7. A resinous composition which comprises a polymerizable, ethylenically unsaturated compound and an amorphous polyester comprising an acid component comprising: (1) an ethylenically unsaturated dicarboxylic acid; a glycol component comprising from about 30 percent to about 85 percent of (2) a dicyclohexanol compound of the formula:

$$HO-C_y-R-C_y-OH$$

where R is an alkylidene radial and $C_y$ is a saturated hydrocarbon radical having a six carbon atom ring, which ring is attached to said OH and said R, and from about 15 percent to about 70 percent of, (3) a neopentyl-glycol type diol having the formula.

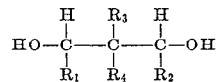

where $R_1$ and $R_2$ are selected from the group consisting of hydrogen and lower alkyl radicals and where $R_3$ and $R_4$ are each lower alkyl radicals.

8. The composition of claim 7 wherein the polyester comprises 4,4'-isopropylidene dicyclohexanol, neopentyl glycol, and an ethylenically unsaturated dicarboxylic acid selected from the group consisting of maleic anhydride and fumaric acid and a member selected from the group consisting of isophthalic acid, terephthalic acid, phthalic acid and phthalic anhydride.

9. The amorphous unsaturated polyester of claim 1 wherein the glycol component comprises up to about 30 mol percent of glycol components other than (1) and (2) above.

10. The amorphous unsaturated polyester of claim 6 wherein the glycol component comprises up to about 30 mol percent of glycol components other than (2) and (3) above.

11. The amorphous unsaturated polyester of claim 7 wherein the glycol component comprises up to about 30 mol percent of glycol components other than (2) and (3) above.

12. The composition of claim 7 wherein the polyester component comprises from about 18 mol percent to about 45 mol percent of 4,4'-isopropylidene dicyclohexanol, from about 18 mol percent to about 45 mol percent of maleic anhydride, from about 9 mol percent to about 36 mol percent neopentyl glycol and from about 28 mol percent to about 0 mol percent of isophthalic acid.

13. The composition of claim 7 wherein the polyester component comprises 36 mol percent of 4,4'-isopropylidene dicyclohexanol, 18 mol percent of neopentyl glycol, 28 mol percent of maleic anhydride, and 18 mol percent isophthalic acid.

14. The composition of claim 7 wherein the polymerizable monomer is styrene.

15. The composition of claim 7 wherein the polymerizable monomer is diallyl phthalate.

16. The composition of claim 7 wherein the polymerizable monomer is vinyl toluene.

17. An article comprising a metal surface having thereon a chemical-resistant adherent coating consisting essentially of a cured layer of the polyester composition of claim 7.

18. A container having as a lining thereon the polyester compositon of claim 7.

References Cited

UNITED STATES PATENTS

| | | | |
|---|---|---|---|
| 2,828,278 | 3/1958 | Kosmin | 260—871 |
| 2,879,249 | 3/1959 | Raichle et al. | 260—871 |

(Other references on following page)

UNITED STATES PATENTS

| | | | |
|---|---|---|---|
| 3,042,650 | 7/1962 | Brockstahler | 260—861 |
| 3,222,421 | 12/1965 | Lundberg | 260—872 |
| 3,345,339 | 10/1967 | Parker et al. | 260—75 |

FOREIGN PATENTS

| | | |
|---|---|---|
| 1,271,106 | 7/1961 | France. |
| 644,287 | 10/1950 | Great Britain. |

MURRAY TILLMAN, *Primary Examiner.*

J. T. GOOLKASIAN, *Assistant Examiner.*

U.S. Cl. X.R.

260—872